United States Patent [19]

Shimogawa et al.

[11] 4,205,807
[45] Jun. 3, 1980

[54] SEAT BELT RETRACTING AND WINDING DEVICE

[75] Inventors: Toshiaki Shimogawa; Eiji Takakuwa, both of Okazaki; Takashi Kawaharazaki, Toyoake; Toshihiro Takei, Okazaki, all of Japan

[73] Assignee: Nippon Soken, Inc., Nishio, Japan

[21] Appl. No.: 908,854

[22] Filed: May 23, 1978

[30] Foreign Application Priority Data

| May 26, 1977 | [JP] | Japan | 52-67790[U] |
| May 26, 1977 | [JP] | Japan | 52-67791[U] |
| May 27, 1977 | [JP] | Japan | 52-68702[U] |
| May 31, 1977 | [JP] | Japan | 52-71227[U] |
| May 31, 1977 | [JP] | Japan | 52-71228[U] |
| May 31, 1977 | [JP] | Japan | 52-71229[U] |

[51] Int. Cl.² .................. A62B 35/02; B65H 75/48
[52] U.S. Cl. ........................... 242/107; 242/107.4 R
[58] Field of Search ..................... 242/107–107.7; 185/9–14, 37, 45; 297/388; 280/803, 806, 807, 808

[56] References Cited

U.S. PATENT DOCUMENTS

| 2,577,553 | 12/1951 | White | 242/107.7 |
| 4,056,242 | 11/1977 | Herrmann | 242/107.4 R |
| 4,060,211 | 11/1977 | Takada | 242/107.7 |

FOREIGN PATENT DOCUMENTS 2606293 9/1976 Fed. Rep. of Germany ............ 242/107

Primary Examiner—John M. Jillions
Attorney, Agent, or Firm—Cushman, Darby & Cushman

[57] ABSTRACT

A seat belt retracting and winding device of the type including spring means including first and second springs imparting a torque to the winding shaft so as to retract the seat belt wound therearound, and control means for changing the torque applied to said winding shaft by the spring means depending upon whether an occupant fastens the seat belt and is restrained by the tension thereof or the occupant releases the seat belt so that the latter is being wound. Securely retaining the outer end or the other end of the second spring is disclosed. To ensure more reliable and dependable operation of the control means, a pawl included in the control means has an improved shape at the engaging end thereof and is positively prevented from the displacement in the direction of the axis of its pivot pin. Thirdly, erratic assembly of a friction disk and a cam disk of the control means may be avoided by the improved designs thereof. Fourthly, when the seat belt is retracted and rewound, the engagement of the pawl with the cam disk may be completely prevented so that damage to the device may be prevented and consequently reliable and dependable operation may be ensured. Finally, the axial movement of the first spring may be prevented, and therefore, the satisfactory operation of the device may be ensured.

8 Claims, 9 Drawing Figures

FIG. I

SEAT BELT RETRACTING AND WINDING DEVICE

BACKGROUND OF THE INVENTION

FIELD OF THE INVENTION

The present invention relates to generally a device for automatically retracting and winding a seat belt when released and more particularly an improvement of a seat belt retracting and winding device of the type having a first spring and a second spring which may be operatively combined in such a way that when an occupant fastens a seat belt, they exert a weak seat belt retracting and winding force, but when the occupant releases the seat belt they exert a strong seat belt retracting and winding force.

Already proposed improved seat belt retracting and winding devices are disclosed in the commonly assigned previous patent applications now pending Morita et al Ser. No. 787,534, which is a continuation application of Ser. No. 656,850, filed on Feb. 10, 1976 and now abandoned, and Ser. No. 809,633 filed on June 24, 1977 issued Nov. 21, 1978 as U.S. Pat. No. 4,126,282.

In these patent applications, disclosed in a specific embodiment is a seat belt retracting and winding device of the type comprising a main body, a seat belt winding shaft rotatably mounted on the main body, spring means comprised of a first spring with one end securely fixed to the main body and a second spring with one end operatively connected to the winding shaft and connected to the first spring in series, thereby imparting the seat belt retracting and winding force to the winding shaft, and control means for causing the spring means to change its seat belt retracting and winding force depending upon whether an occupant fastens a seat belt and is restrained by the tension thereof or the occupant releases the seat belt so that the seat belt is being wound.

SUMMARY OF THE INVENTION

A first object of the present invention is to provide a seat belt retracting and winding device of the general type described above wherein the outer end of the second spring is so securely retained in position that even when a great impact force is exerted to the second spring, the outer end thereof may be positively retained in position and that the outer end of the second spring may be free from excessive bending forces and wherein the novel method and means for retaining the outer end of the second spring in the manner described above may contribute to the considerable reduction in cost.

A second object of the present invention is to provide a seat belt retracting and winding device of the type described above wherein the free end of a pawl which is a part of the control means is bifurcated into a projection solely for engagement with a friction disk and a cam disk and into an engaging end solely for engagement with the teeth of a ratchet wheel, whereby the reliable and dependable operation of the control means may be ensured.

A third object of the present invention is to provide a seat belt retracting and winding device of the type described above wherein a ratchet wheel which is a part of the control means has an annular flange extended radially outwardly of the addendum circle of the teeth thereof, whereby the axial displacement of the first spring may be positively avoided.

A fourth object of the present invention is to provide a seat belt retracting and winding device of the type described above wherein the pawl is formed with a projection extended from the base portion of the pawl for engagement with a stopper of a stationary member or a housing, whereby the displacement of the pawl in the direction of the axis of its pivot pin may be positively avoided.

A fifth object of the present invention is to provide a seat belt retracting and winding device of the type described above wherein a stepped wheel having two outside diameters is mounted on one end of the winding shaft for rotation in unison therewith and a cam disk and a friction disk which are also parts of the control means are mounted on the stepped wheel such that the misassembly of the cam and friction disks may be prevented.

A sixth object of the present invention is to provide a seat belt retracting and winding device of the type described above wherein when the seat belt is being retracted and rewound, the rotation of the cam disk may be permitted without the cam portion thereof being in engagement with the pawl, whereby the generation of the noise due to the contact between them may be eliminated.

To the above and other ends, the present invention provides a seat belt retracting and winding device comprising a main body; a winding shaft rotatably mounted on said main body; spring means comprising a first spring with one end thereof securely fixed to said main body and a second spring with one end operatively connected to said winding shaft and connected in series to said first spring, said spring means exerting a torque on said winding shaft so as to retract a seat belt wound therearound; control means for changing said torque exerted to said winding shaft by said spring means depending upon whether an occupant fastens said seat belt and is restrained by the tension thereof or said seat belt is released and wound around said winding shaft, said control means including a ratchet wheel which is rotatably carried on said winding shaft and to which are securely fixed the other ends of said first and second springs of said spring means, said ratchet wheel being formed with a guide means and a hook means, said guide means having a cross sectional configuration with a convex side surface directed radially outwardly, and a pawl for selective engagement with said ratchet wheel, thereby causing said spring means to reduce said torque exerted to said winding shaft and hence reduce the retracting force exerted to said seat belt; and said second spring being a spiral coiled spring and said the other end or the outer end of said second spring being extended along said radially outwardly directed convex side surface of said guide means, folded back along said hook means, passed between said radially outwardly directed convex side surface of said guide means and a portion of said second spring overlying thereon along said convex side surface.

Since the outer end of the second spring is retained by the ratchet wheel in the manner described above, even when a great impact force is exerted to the second spring, the outer end portion of the second spring will not be pulled out of its retaining means because of the frictional forces between the overlapped portions of the second spring and between the guide and hook means on the one hand and the second spring on the other hand. Furthermore since the second spring is made to contact with the radially outwardly directed convex side surface of the guide means and the second spring is folded back along the hook means which has an aerofoil-like cross sectional configuration, the second spring is not exerted with excessive bending forces. Moreover the second spring may have the stabilized torque characteristic and may be made less expensive to manufacture.

Since the free end of the pawl is terminated into the projection solely for engagement with the friction and cam disks and into the engaging end solely for engagement with the ratchet wheel, the engagement of the pawl with these disks and the ratchet wheel may be much stabilized. As a result, the satisfactory, reliable and dependable operation of the device may be ensured.

Since the ratchet wheel has the flange extended radially outwardly of the addendum circle of the teeth thereof so that the axial movement of the first spring may be prevented, the first spring will not interfere with the operation of the pawl and its associated members, whereby the satisfactory, reliable and dependable operation of the seat belt retracting and winding device may be ensured.

Since the pawl is provided with the projection for engagement with the stopper in order to prevent the above-mentioned displacement of the pawl, the pawl will not come out of the housing after the pawl has been assembled with the housing. As a result, the assembly of the housing containing the first spring with the second housing may be much facilitated. Furthermore the positive engagement of the pawl with the ratchet wheel may be ensured.

Since the friction disk and the cam disk are arranged so as to be mounted respectively on the peripheries of the stepped wheel whose diameters are different from each other, both disks do not interfere with each other, whereby the erroneous assembly of these disks and also the incorrect operation thereof may be completely eliminated.

Since the friction and cam disks are mounted in coaxial relationship and because the distance from the axis of rotation of the friction disk to the radially outermost periphery of the second ridge for engagement with the pawl is equal to or slightly greater than the distance from the axis of rotation of the cam disk to the radially outermost point of the cam portion of the cam disk for engagement with the pawl, in case of rewinding the seat belt the cam disk may freely rotate without the cam portion thereof out of engagement with the pawl. As a result the noise caused by the contact between the pawl and the cam portion may be eliminated. Furthermore the seat belt retracting and rewinding operation may be much facilitated.

The above and other objects, features and advantages of the present invention will become more apparent from the following description of one preferred embodiment thereof taken in conjunction with the accompanying drawings.

DETAILED DESCRIPTION OF THE PREFERRED EMBODIMENT

Figure 1:
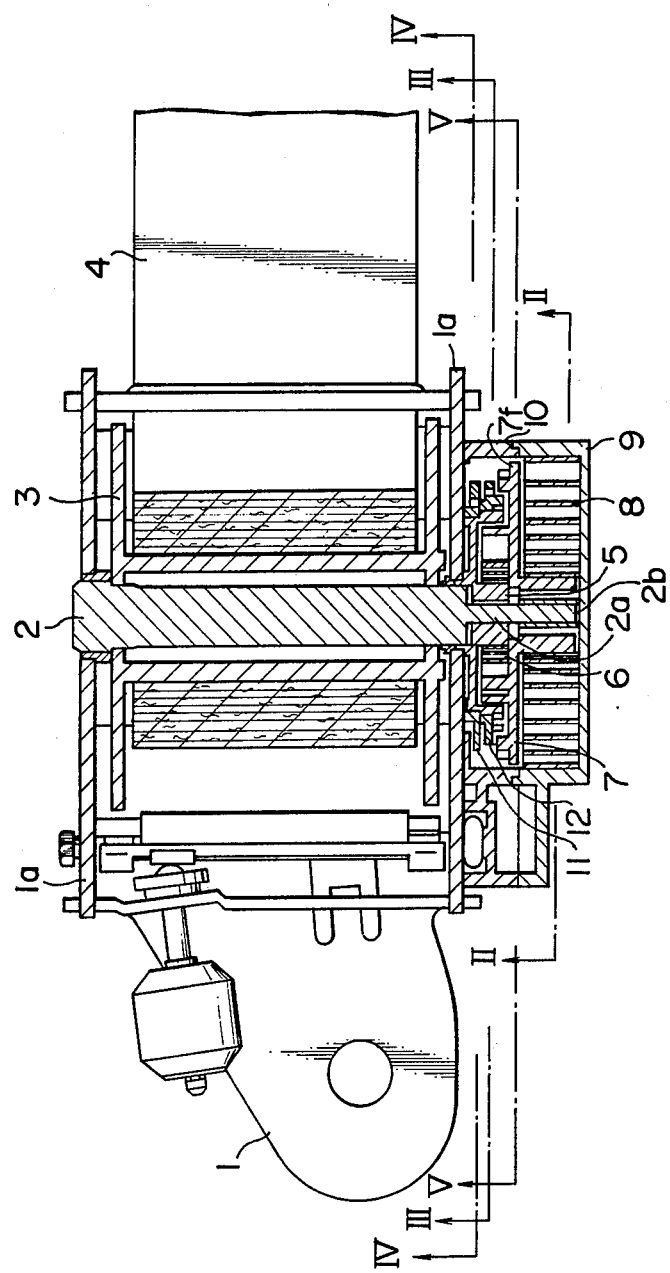
FIG. 1 is a sectional view of a preferred embodiment of a seat belt retracting and winding device in accordance with the present invention.

Referring to the accompanying drawings and particularly FIG. 1, a preferred embodiment of a seat belt retracting and winding device in accordance with the present invention has a main body or a frame 1 having side plates 1a between which is rotatably mounted a winding shaft 2 which in turn mounts a seat belt winding reel 3. In case of an accident, the winding shaft 2 and the winding reel 3 can be positively locked against rotation by a locking mechanism to be described in detail hereinafter. One end of a seat belt 4 for restraining an occupant on a seat is securely fixed to the winding shaft while the other end is securely fixed through a slip joint or the like to an anchor. The seat belt 4 may be wound around the winding shaft 3 and may be paid out therefrom as will be described in detail hereinafter. The winding shaft 2 has a neck consisting of a tenon like portion 2a (See FIG. 4) rectangular in cross section and a reduced diameter portion 2b (See FIG. 2) circular in cross section and contiguous to the tenon like portion 2a.

Figure 3:
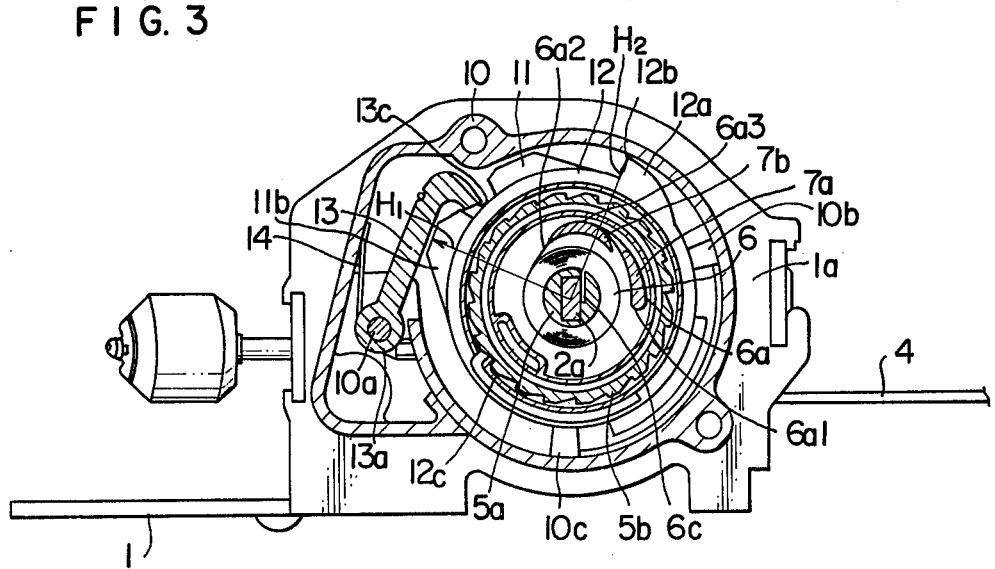
FIG. 3 is a sectional view taken along the line III—III of FIG. 1.
Figure 4:
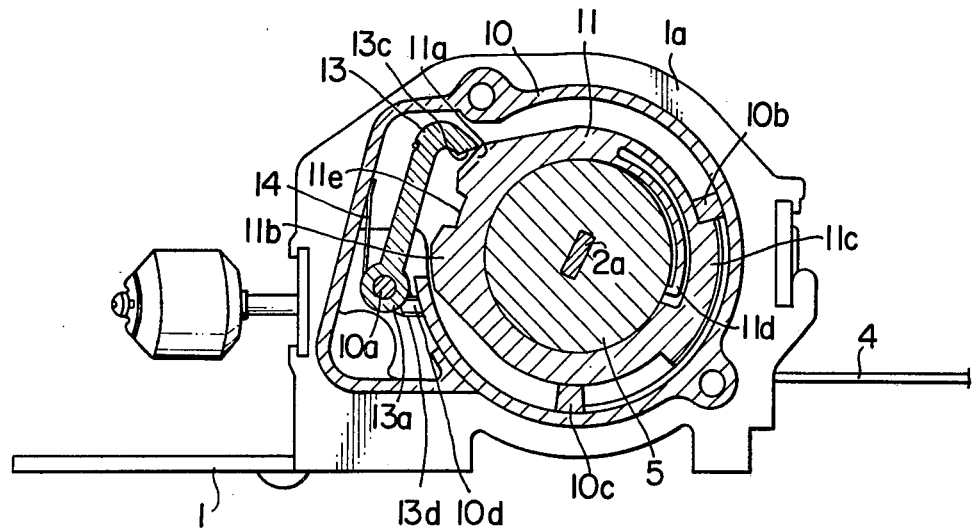
FIG. 4 is a sectional view taken along the line IV—IV of FIG. 1.

As best shown in FIG. 4, a stepped wheel 5 with two outer diameters is securely carried by the winding shaft 2 with a mortise-like hole of the wheel 5 securely fitted over the tenon-like portion 2a of the shaft 2, whereby the wheel 5 may rotate in unison with the winding shaft 2. A second coiled spring 6 is disposed within the wheel 5. A friction disk 11 (See FIG. 4) is fitted over the small-diameter periphery of the wheel 5 while a cam disk 12 (See FIG. 3) is fitted over the large-diameter periphery thereof. The reason why the diameters of the openings of the friction disk 11 and cam disk 12 are different is that it may be prevented to misplace both disks on the wheel 5. Furthermore the stable operation of a pawl 13 (See FIG. 3) may be ensured.

As best shown in FIG. 3, a slit is formed in a neck portion or a shaft 5a of the wheel 5 in such a way that the inner end 6c of the second spring 6 may be inserted into this slit and may be securely clamped between the neck portion 5a and the tenon-like portion 2a of the winding shaft 2. Still referring to FIG. 3, a one-way or unidirectional ratchet wheel 5b carried by the wheel 5 engages with a pawl 12c of the cam disk 12 only when the ratchet wheel 5b rotates in the clockwise direction in which the seat belt is wound around the winding shaft 3, whereby the wheel 5 and the cam disk 12 may rotate in unison with each other. Therefore the ratchet wheel 5b and the pawl 12c make up a one-way or unidirectional clutch.

The second spring 6 is weaker in torque and shorter in length than a first spring 8 (See FIG. 1) to be described hereinafter. As best shown in FIG. 3, a ratchet wheel 7 (See also FIG. 1) is formed with a guide projection 7b and a hook projection 7a. The guide projection 7b has a crescent-like cross sectional configuration with a radially outwardly directed convex side surface. The hook projection 7a has an aerofoil-like cross sectional configuration. In assembly, the outer end 6a of the second spring 6 is passed along the outward convex surface of the guide projection 7b and then along the outward convex surface of the hook projection 7a, folded back along the leading edge of the hook projection 7a at 6a₁, passed along the inward concave surface of the hook projection 7a and then between the outward convex surface of the guide projection 7b and the second spring 6 and finally extended beyond the guide projection 7b to the position 6a₂. Therefore the second spring 6 is overlapped along the outward convex surface of the guide projection 7b as indicated by 6a₃. As a result, even when a strong impact force is exerted to the second spring 6, the outer end 6a of the second spring 6 may be securely retained in position because of the frictional forces acting between the overlapped portions of the second spring 6 and between the guide and hook projections 7b and 7a on the one hand and the second spring 6 on the other hand. The inner end 6c of the second spring 6 is securely clamped between the tenon-like portion 2a of the winding shaft 2 and the neck or shaft 5a of the wheel 5 as described above.

The ratchet wheel 7 which interconnects in series the first and second springs 8 and 6 has a shaft 7c (See FIG. 2) fitted over the reduced-diameter portion 2b of the winding shaft 2 for free rotation therearound, teeth 7d for engagement with the pawl 13 (See FIG. 5), a slit 7e (See FIG. 2) formed in the free end of the shaft 7c for securely receiving the inner end 8b of the first spring 8, the hook and guide projections 7a and 7b described above, and a flange 7f (See FIG. 1) which has a diameter greater than that of the addendum circle of the teeth 7d and which serves to prevent the inward shift of the first spring 8 toward the belt winding reel 3.

Figure 2:
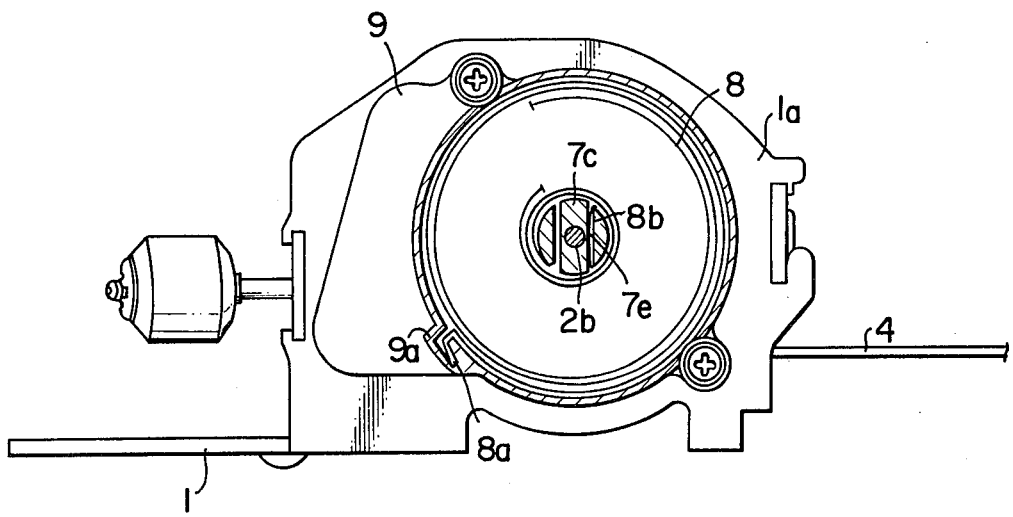
FIG. 2 is a sectional view taken along the line II—II of FIG. 1.

The first spring 8 is wound around the shaft 7c of the ratchet wheel 7 and is housed within an annular space defined between the shaft 7c and the flange 7f of the ratchet wheel 7 and a housing or a barrel 9. As best shown in FIG. 2 the outer end 8a of the first spring 8 is made into engagement with a hook 9a of the housing or barrel 9 and is securely fixed to the main body or frame 1 while the inner end 8b is securely fixed in the manner described above.

The first and second springs 8 and 6 are therefore interconnected in series to each other through the ratchet wheel 7. One end of these series-connected first and second springs 8 and 6 is secured to the winding shaft 2 while the other end is fixed securely to the housing 9 in the manner described above. As a result, when the free rotation of the ratchet wheel 7 is permitted, the first and second springs 8 and 6 function as one spring for imparting the torque to the winding shaft 2 for retracting and winding the seat belt 4.

Figure 9:
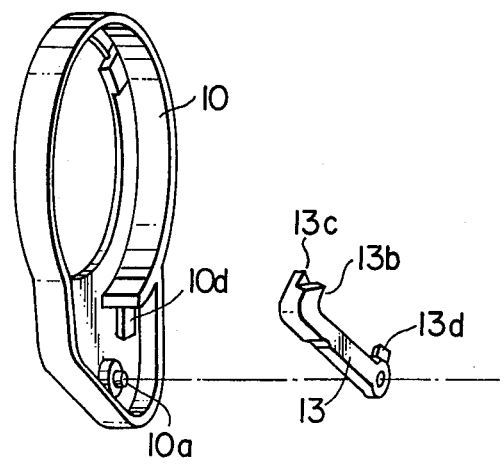
FIG. 9 is an exploded perspective view of a housing and a pawl.

Referring back to FIG. 1, a second housing 10 which is mounted together with the housing or barrel 9 with screws or the like to the main body or frame 1 serves to protect the wheel 5, the ratchet wheel 7, the friction disk 11, the cam disk 12 and the pawl 13. As best shown in FIG. 3, the second housing 10 has a protrusion or a pivot pin 10a for pivoting the pawl 13, a payout stopper 10b, a retraction stopper 10c and a stopper 10d (See FIG. 4 and FIG. 9) for engagement with a projection or a lever 13d of the pawl 13.

Next referring to FIG. 4, the friction disk 11 which is securely fitted over the small-diameter periphery of the wheel 5 has a first ridge 11a, a second ridge 11b, a radially inwardly recessed portion or a valley 11e, a spring 11d formed integral with the friction disk 11 and made into engagement with the wheel 5 so that the friction disk 11 may be selectively rotated in unison with the wheel 5, and a lever or a third ridge 11c for engagement with the stopper 10b or 10c of the housing 10, thereby limiting the angle of rotation of the friction disk 11. Therefore the friction disk 11 may rotate in unison with the wheel 5 and hence the winding shaft 2 except when the pawl 13 engages with the first or second ridge 11a or 11b or the third ridge 11c engages with the stopper 10b or 10c of the housing 10.

Referring to FIG. 3, the cam disk 12 which is fitted over the large-diameter periphery of the wheel 5 has a cam portion 12a (See also FIG. 5) for engagement with the pawl 13, a stop 12b for also engagement with the pawl 13 so that the counterclockwise rotation of the cam disk 12 may be prevented, and the pawl 12c for engagement with the ratchet wheel 5b of the wheel 5 only when the seat belt is retracted and rewound as described elsewhere.

Referring to FIGS. 3, 4, 5, and 9, the pawl 13 is pivotally mounted with the pin 10a to the housing 10, and the free end of the pawl 13 is formed with a pallet or an engaging end 13b for engagement with the teeth 7d of the ratchet wheel 7 and a stopper or projection 13c for engagement with the stop 12b of the cam disk 12 (See FIG. 5) and the first and second ridges 11a and 11b of the friction disk 11. The lever or projection 13d is extended from the base portion 13a of the pawl 13 for engagement with the stopper 10d so that the pawl 13 may not slide over the pivot pin 10a axially thereof. More particularly, referring to FIG. 9, the projection 13d of the pawl 13 engages with the stopper 10d of the housing 10 so that the pawl 13 may be prevented from coming out of the pivot pin 10a. As a result, the assembly of the housing 10 including the pawl 13 with other parts may be much facilitated.

Referring back to FIG. 3, a bias spring 14 is loaded between the pawl 13 and the housing 10 so that the pawl 13 may be normally biased in the clockwise direction.

Figure 5:
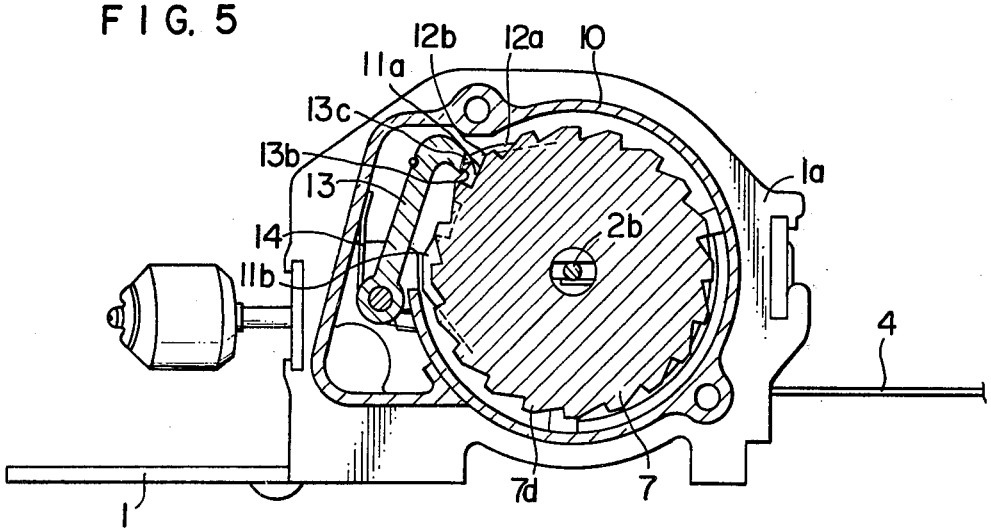
FIGS. 5–8 are sectional views taken along the line V—V of FIG. 1 used for the explanation of the mode of operation of the first embodiment.

Referring to FIGS. 3, 4 and 5, the following relations are held:

The distance from the axis of the winding shaft 2 to the radially outermost periphery of the second ridge 11b of the friction disk 11 $\geq$ the distance from the axis of the winding shaft 2 to the radially outermost point of the cam portion 12a of the cam disk 12 $>$ the distance from the axis of the winding shaft 2 to the radially outermost point of the first ridge 11a of the friction disk 11 $>$ the radius of the addendum circle of the ratchet wheel 7.

As shown in FIG. 3 the distance $H_1$ from the axis of the winding shaft 2 to the radially outermost periphery of the second ridge 11b of the friction disk 11 is greater than the distance $H_2$ from the axis of the winding shaft 2 to the radially outermost point of the cam portion 12a of the cam disk 12.

Next the mode of operation of the seat belt retracting and winding device with the above construction will be described. When an occupant or a driver pulls the seat belt 4 for fastening it, the winding reel 3 and the winding shaft 2 are rotated in the counterclockwise direction so that the wheel 5 carrying the friction disk 11 and the cam disk 12 is also caused to rotate in the counterclockwise direction, when the friction disk 11 and the cam plate 12 are not engaged with the pawl 13 and the stopper 10b or 10c of the housing 10, from the positions shown in FIG. 8. When the stop 12b of the cam disk 12 engages with the stopper or projection 13c of the pawl 13, the pawl 12c of the cam disk 12 is held at the position shown in FIG. 5 after having slid over the points of the one-way or unidirectional ratchet wheel 5b of the wheel 5. The friction disk 11 and the cam disk 12 which are rotated in the counterclockwise direction are stopped when the projection 13c of the pawl 13 engages with the first ridge 11a of the friction disk 11. As the seat belt 4 is further paid out so that the ratchet wheel 7 is further rotated, the tooth 7d of the ratchet wheel 7 pushes up the pawl 13 (See FIG. 5) so that the pawl 13 is released from the first ridge 11a of the friction disk 11, whereby the further rotation of the friction disk 11 is permitted. When the third ridge 11c of the friction disk 11 engages with the stopper 10b of the housing 10 (FIG. 4), the rotation of the friction disk 11 is stopped again. Under this condition, the first ridge 11a of the friction disk 11 is made into engagement with the stopper or projection 13c of the pawl 13, the pallet 13b thereof is moved away from the teeth 7d of the ratchet wheel 7 (See FIG. 5). As a result, the ratchet wheel 7 may rotate freely.

When the seat belt 4 is paid out in the manner described above and fastened, the paid out length of the seat belt 4 is in general slightly greater than the length of the seat belt 4 required for restraining the occupant. Therefore the seat belt 4 is slightly retracted and rewound in the manner described below. First referring to FIG. 5, the wheel 5 is rotated in the clockwise direction so that the friction disk 11 and the cam disk 12 are also rotated in the clockwise direction because they are not restrained. When the free end of the pawl 13 drops into the valley 11e of the friction disk 11, the pallet 13b engages with the tooth 7d of the ratchet wheel 7 (See FIG. 6) so that the ratchet wheel 7 is prevented from rotating in the clockwise direction in which the seat belt is retracted and rewound. As a result, the first spring 8 the inner end 8b of which is made fast to the ratchet wheel 7 is locked so that only the second spring 6 may apply the torque to the winding shaft 2. That is, the force for retracting and rewinding the seat belt around the seat belt winding reel 3 is decreased in strength so that the force restraining the occupant is also relaxed. This is the normal restraining mode in which the occupant may freely approach a cigarette lighter, a radio and so on.

Figure 6:
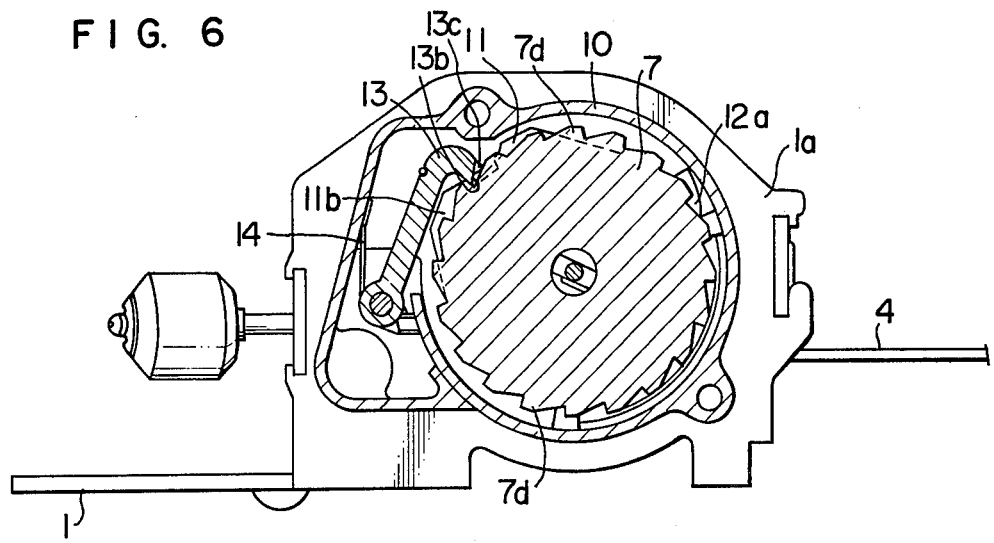
Figure 7:
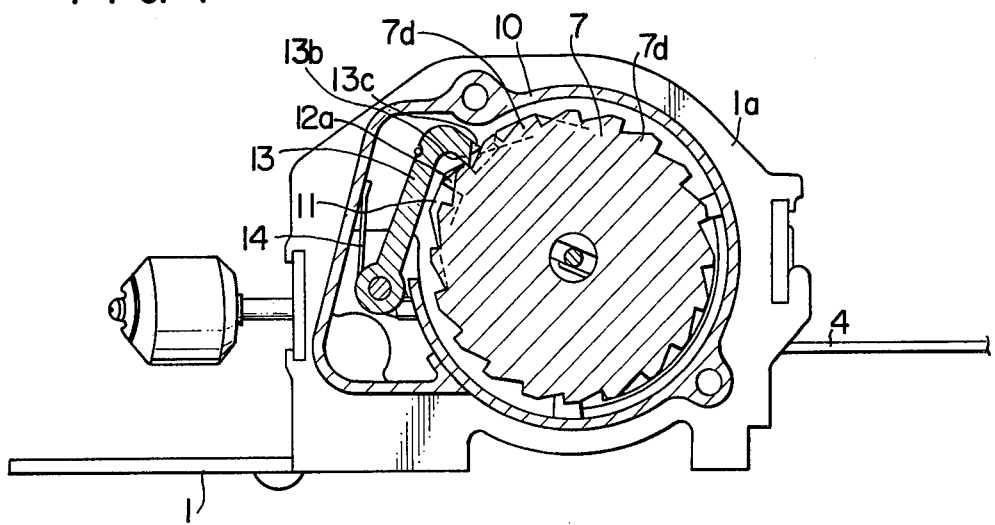
Figure 8:
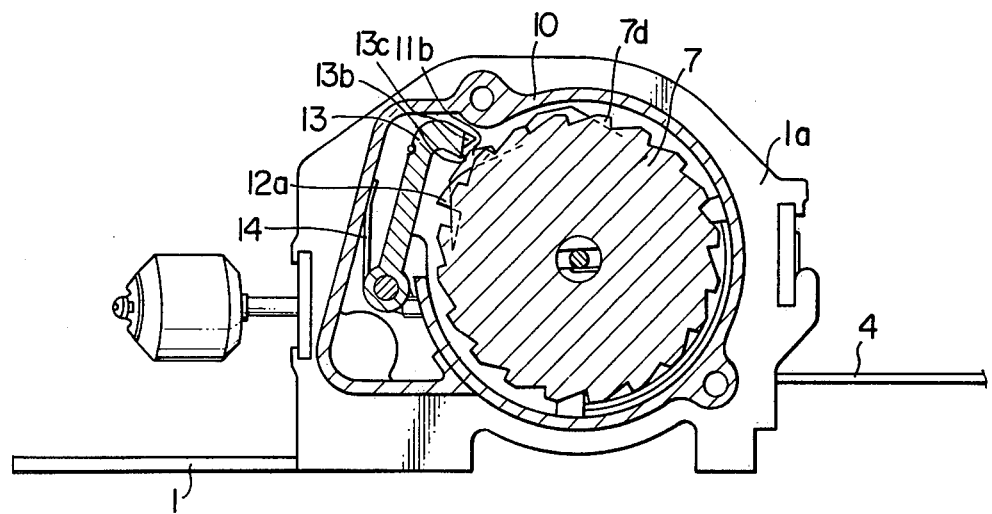

When the occupant releases the seat belt 4 from the position shown in FIG. 6, the second spring 6 starts retracting and rewinding the seat belt 4. The cam disk 12 is rotated in unison with the shaft 2 and the cam portion 12a of the cam disk 12 is made into contact with the stopper 13c of the pawl 13 at the position shown in FIG. 7. As the cam disk 12 is further rotated, the cam portion 12a pushes the stopper 13c upward. In this case, the pallet or engaging end 13b of the pawl 13 is made into engagement with the teeth 7d of the ratchet wheel 7 so that the torque of the first spring 8 is exerted as a load to the pawl 13, but the cam portion 12a may push upward the stopper 13c against this load. When the cam disk 12 is further rotated, the engaging end 13b of the pawl 13 is moved away from the teeth 7d of the ratchet wheel 7 as shown in FIG. 8. Therefore the second spring 6 and the first spring 8 are connected in series to each other so that the torque of the first spring 8 which has been coiled may be imparted to the winding shaft 2 through the second spring 6 so that the seat belt retracting and rewinding force may be suddenly increased.

The friction disk 11 has been rotated in the clockwise direction in unison with the cam disk 12, and when the cam disk 12 has pushed up the pawl 13 away from the ratchet wheel 7 in the manner described above, the second ridge 11b of the friction disk 11 engages with the engaging end 13b of the pawl 13 so as to keep it away from the teeth 7d of the ratchet wheel 7 as shown in FIG. 8. As a result the free rotation of the ratchet wheel 7 may be permitted so that the seat belt retracting and rewinding force may be increased as described above.

As described previously, the distance from the axis of the friction disk 11 to the radially outermost point of the second ridge 11b of the friction disk is equal to the distance from the axis of the cam disk 12 to the radially outermost point of the cam portion 12a thereof. Therefore the reengagement of the cam portion 12a of the cam disk 12 with the stopper 13c of the pawl may be prevented so that the smooth seat belt retraction may be ensured.

Next will be described the mode of operation when the winding shaft 2 makes more than one rotation after the seat belt 4 has been fastened because for instance the driver moves toward the door opposite to the door on his or her side for driving a door regulator handle. The cam portion 12a of the cam disk 12 is rotated in the counterclockwise direction from the position shown in FIG. 6 as the seat belt is paid out and the cam portion 12a stops at the position shown in FIG. 5. When the seat belt 4 is retracted and rewound from this position so that the winding shaft makes more than one rotation, the cam portion 12a releases the engagement between the engaging end 13b of the pawl 13 and the teeth 7d of the ratchet wheel as is the case of the seat belt retraction and rewinding. As a result, although the seat belt has been fastened, the seat belt retracting and rewinding force is suddenly increased. If, however, thereafter the seat belt is paid out, the cam disk 12 and the friction disk 11 are rotated in the counterclockwise direction from the positions shown in FIG. 8 to the positions shown in FIG. 5. When the driver returns to his normal position, the seat belt is retracted so that the pawl 13 engages with the ratchet wheel 7 as shown in FIG. 6. As a result, the seat belt retracting force is decreased so that the occupant restraining force may be relaxed accordingly in the manner described above.

So far the second spring has been described as being in the form of a spiralled belt, but it will be understood that it may be a spiral coiled spring of a circular cross section made of a commonly used wire or a conventional twisted coiled spring made of a wire. The spring 11d of the friction disk 11 (See FIG. 4) and the pawl 12c of the cam disk 12 (See FIG. 3) have been described as being formed integral with the disks 11 and 12, respectively, but it will be understood that a separate spring and pawl may be attached to them. Alternatively, they may be made of a suitable spring material and may be made integral with the disks 11 and 12.

In general, the second spring 6 has flat surfaces, but its upper and lower surfaces of the outer end 6a (See FIG. 3) may be formed with mating ridges and valleys so that when they are made into contact with each other at the overlapping portion 6a₂ these ridges and valleys may engage with each other and consequently the outer end 6a of the second spring 6 may be more securely retained in position. Furthermore when the length of the second spring 6 which is extended along the guide and hook projections 7b and 7a, folded back along the hook projection 7a and overlapped along the guide projection 7b, the coiled spring characteristics may be obtained which are entirely different from those of the conventional coiled springs. Therefore the method for retaining the second spring 6 in accordance with the present invention may find various applications in addition to the seat belt retracting and rewinding device described above.

What we claim is:

1. A seat belt retracting and winding device comprising
   (a) a main body;
   (b) a winding shaft rotatably mounted on said main body;
   (c) spring means comprising a first spring with one end thereof securely fixed to said main body and a second spring which is weaker than said first spring and has one end operatively connected to said winding shaft and connected in series to said first spring, said spring means exerting a torque on said winding shaft so as to retract a seat belt wound therearound; and
   (d) control means for changing said torque exerted to said winding shaft by said spring means depending upon whether an occupant fastens said seat belt and is restrained by the tension thereof or said seat belt is released and wound around said winding shaft, said control means including
   a ratchet wheel which is rotatably carried on said winding shaft and to which are securely fixed the other ends of said first and second springs of said spring means, said ratchet wheel being formed with a guide means and a hook means, said guide means having a cross sectional configuration with a convex side surface directed radially outwardly, said hook means including a curved portion and
   a pawl for selective engagement with said ratchet wheel for causing said spring means to reduce said torque exerted to said winding shaft and hence reduce the retracting force exerted to said seat belt; and
   said second spring being a spiral coiled spring and said the other end or the outer end of said second spring being extended along said radially outwardly directed convex side surface of said guide means, folded back along the curved portion of said hook means, passed between said radially outwardly directed convex side surface of said guide means and a portion of said second spring overlying thereon along said convex side surface.

2. A seat belt retracting and winding device as set forth in claim 1, said control means further including
   a friction disk mounted for rotation in unison with said winding shaft to a first predetermined angular position where said friction disk causes said pawl to engage with said ratchet wheel or to a second predetermined angular position where said friction disk causes said pawl to be out of engagement from said ratchet wheel,
   a cam disk mounted for rotation in unison with said winding shaft to a predetermined angular position at which said cam disk causes said pawl to be out of engagement from said ratchet wheel, and
   said pawl having at its free end an engaging end for engagement with said ratchet wheel and a stopper for engagement with said friction disk and said cam disk.

3. A seat belt retracting and winding device as set forth in claim 1 wherein
   said ratchet wheel has an annular flange radially outwardly extended beyond the addendum circle of the teeth of said ratchet wheel, whereby the displacement of said first spring in the axial direction thereof may be prevented.

4. A seat belt retracting and winding device as set forth in claim 1 wherein
   said pawl has a projection extended from the base portion or the pivoted point thereof for engagement with an engaging member provided on said main body, whereby the displacement of said pawl in the direction of the axis of its pivot pin may be prevented.

5. A seat belt retracting and winding device as set forth in claim 1 wherein
   a stepped wheel is mounted on said winding shaft at one end portion thereof for rotation in unison therewith and has a small-diameter periphery and a large-diameter periphery, and
   said control means includes
   a friction disk mounted for rotation in unison with said winding shaft to a first predetermined angular position where said friction disk causes said pawl to engage with said ratchet wheel or to a second predetermined angular position where said friction disk causes said pawl to be out of engagement from said ratchet wheel, and
   a cam disk mounted for rotation in unison with said winding shaft to a predetermined angular position at which said cam disk causes said pawl to be out of engagement from said ratchet wheel, one of said friction disk and said cam disk being mounted on said small-diameter periphery of said stepped wheel and the other being mounted on said large-diameter periphery of said stepped wheel.

6. A seat belt retracting and winding device as set forth in claim 1 wherein
   said control means further includes
   a friction disk mounted for rotation in unison with said winding shaft to a first predetermined angular position at which said friction disk causes said pawl to engage with said ratchet wheel or a second predetermined angular position at which said friction disk causes said pawl to be out of engagement from said ratchet wheel, and
   a cam disk mounted coaxially of said friction disk for rotation in unison with said winding shaft to a predetermined angular position at which said cam disk causes said pawl to be out of engagement from said ratchet wheel,
   the distance from the axis of rotation of said friction disk to the radially outermost periphery of a portion thereof which engages with said pawl when said friction disk is in said second predetermined angular position being equal to or greater than the distance from the axis of rotation of said cam disk to the radially outermost point of a portion thereof which engages with said pawl at said predetermined angular position.

7. A seat belt retracting and winding device as set forth in claim 1 wherein said guide means has a crescent-like cross sectional configuration.

8. A seat belt retracting and winding device as set forth in claim 1 wherein said hook means has an aerofoil-like cross sectional configuration.

* * * * *